US010013728B2

(12) United States Patent
Schechter et al.

(10) Patent No.: US 10,013,728 B2
(45) Date of Patent: Jul. 3, 2018

(54) SOCIAL AUTHENTICATION FOR ACCOUNT RECOVERY

(71) Applicant: Microsoft Technology Licensing, LLC, Redmond, WA (US)

(72) Inventors: Stuart Schechter, Kirkland, WA (US); Robert Wilson Reeder, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 957 days.

(21) Appl. No.: 14/326,377

(22) Filed: Jul. 8, 2014

(65) Prior Publication Data

US 2014/0324722 A1 Oct. 30, 2014

Related U.S. Application Data

(63) Continuation of application No. 12/466,246, filed on May 14, 2009, now Pat. No. 8,856,879.

(51) Int. Cl.
*G06Q 50/26* (2012.01)
*G06F 21/31* (2013.01)
(Continued)

(52) U.S. Cl.
CPC ........... *G06Q 50/265* (2013.01); *G06F 17/30* (2013.01); *G06F 21/31* (2013.01); *G06F 21/41* (2013.01);
(Continued)

(58) Field of Classification Search
CPC .................................................. G06Q 50/265
(Continued)

(56) References Cited

U.S. PATENT DOCUMENTS 5,035,625 A 7/1991 Munson et al.
5,180,309 A 1/1993 Egnor
(Continued)

FOREIGN PATENT DOCUMENTS

JP WO 2004036394 A1 * 4/2004 ............ G06F 21/31
WO W02005045550 A2 5/2005
(Continued)

OTHER PUBLICATIONS

Schechter et al., "It's Not What You Know, But Who You Know", "A social approach to last-resort authentication", copyright 2009 ACM, Apr. 2009.*

(Continued)

*Primary Examiner* — O. C. Vostal
(74) *Attorney, Agent, or Firm* — Drinker Biddle & Reath LLP

(57) ABSTRACT

A backup account recovery authentication of last resort using social authentication is described. The account holder requests trustees who have been previously identified to obtain an account recovery code. The account recovery system sends a communication to the trustee for information to verify the trustee as one of the previously identified trustees. The account recovery system then may transmit a link and code with instructions for the trustee to return the link. The account recovery system then transmits a situational query to the trustee to provide additional security. Finally, if all the communications have been completed for the required level of security, the account recovery code is transmitted to the trustee. The trustee sends the account recovery code to the account holder for access to an account.

20 Claims, 8 Drawing Sheets

(51) Int. Cl.

| | | |
|---|---|---|
| *G06F 21/41* | (2013.01) | |
| *H04L 29/06* | (2006.01) | |
| *G06F 17/30* | (2006.01) | |
| *G06Q 10/00* | (2012.01) | |
| *H04L 9/32* | (2006.01) | |
| *H04L 15/06* | (2006.01) | |
| *H04L 12/58* | (2006.01) | |
| *H04M 1/665* | (2006.01) | |
| *H04M 1/673* | (2006.01) | |
| *H04M 1/675* | (2006.01) | |
| *H04M 1/727* | (2006.01) | |
| *H04M 3/38* | (2006.01) | |
| *H04N 5/92* | (2006.01) | |
| *H04W 12/06* | (2009.01) | |

(52) U.S. Cl.
CPC ............. *G06Q 10/00* (2013.01); *H04L 9/321* (2013.01); *H04L 63/083* (2013.01); *G06F 2221/2131* (2013.01); *H04L 9/3226* (2013.01); *H04L 15/06* (2013.01); *H04L 29/06* (2013.01); *H04L 51/18* (2013.01); *H04L 63/08* (2013.01); *H04L 63/10* (2013.01); *H04M 1/665* (2013.01); *H04M 1/673* (2013.01); *H04M 1/675* (2013.01); *H04M 1/727* (2013.01); *H04M 3/382* (2013.01); *H04M 2215/0156* (2013.01); *H04N 5/9208* (2013.01); *H04W 12/06* (2013.01)

(58) Field of Classification Search
USPC .......................................................... 726/4
See application file for complete search history.

(56) References Cited

U.S. PATENT DOCUMENTS

| | | | |
|---|---|---|---|
| 5,276,737 A | 1/1994 | Micali | |
| 5,712,913 A * | 1/1998 | Chaum | G06Q 20/085 380/30 |
| 5,719,560 A | 2/1998 | Watkins | |
| 5,719,941 A | 2/1998 | Swift et al. | |
| 5,774,588 A | 6/1998 | Li | |
| 5,793,951 A | 8/1998 | Stein et al. | |
| 5,822,544 A | 10/1998 | Chaco et al. | |
| 5,907,618 A | 5/1999 | Gennaro et al. | |
| 5,920,630 A | 7/1999 | Wertheimer et al. | |
| 5,948,054 A | 9/1999 | Nielsen | |
| 6,026,163 A | 2/2000 | Micali | |
| 6,058,188 A | 5/2000 | Chandersekaran et al. | |
| 6,067,444 A | 5/2000 | Cannon et al. | |
| 6,073,099 A | 6/2000 | Sabourin et al. | |
| 6,128,735 A | 10/2000 | Goldstein et al. | |
| 6,141,423 A | 10/2000 | Fischer | |
| 6,157,920 A | 12/2000 | Jakobsson et al. | |
| 6,160,891 A | 12/2000 | Al-Salqan | |
| 6,185,678 B1 * | 2/2001 | Arbaugh | G06F 21/575 713/2 |
| 6,202,150 B1 * | 3/2001 | Young | H04L 9/0869 713/155 |
| 6,216,229 B1 | 4/2001 | Fischer | |
| 6,243,466 B1 * | 6/2001 | Young | H04L 9/0894 380/277 |
| 6,249,585 B1 | 6/2001 | McGrew et al. | |
| 6,289,353 B1 | 9/2001 | Hazlehurst et al. | |
| 6,291,399 B1 | 9/2001 | Henmi et al. | |
| 6,389,136 B1 | 5/2002 | Young et al. | |
| 6,487,411 B1 | 11/2002 | Laakso et al. | |
| 6,594,684 B1 | 7/2003 | Hodjat et al. | |
| 6,755,661 B2 | 6/2004 | Sugimoto | |
| 6,775,382 B1 | 8/2004 | Al-Salqan | |
| 6,941,459 B1 | 9/2005 | Hind et al. | |
| 6,954,755 B2 | 10/2005 | Reisman | |
| 7,082,429 B2 | 7/2006 | Lin et al. | |
| 7,106,845 B1 | 9/2006 | Zhuk et al. | |
| 7,178,065 B2 | 2/2007 | Dinker et al. | |
| 7,181,017 B1 | 2/2007 | Nagel et al. | |
| 7,263,717 B1 | 8/2007 | Boydstun et al. | |
| 7,330,971 B1 | 2/2008 | Kukreja et al. | |
| 7,610,491 B1 * | 10/2009 | Tsao | G06F 21/31 713/182 |
| 7,634,800 B2 | 12/2009 | Ide et al. | |
| 7,644,285 B1 * | 1/2010 | Murray | G06F 21/31 380/285 |
| 7,788,708 B2 | 8/2010 | Doane et al. | |
| 7,827,183 B2 | 11/2010 | Fraser et al. | |
| 7,831,836 B2 | 11/2010 | Beck et al. | |
| 7,860,706 B2 | 12/2010 | Abir | |
| 7,954,144 B1 | 5/2011 | Ebrahimi et al. | |
| 7,983,979 B2 | 7/2011 | Holland, IV | |
| 8,015,606 B1 | 9/2011 | Jevans et al. | |
| 8,024,280 B2 | 9/2011 | Jessus et al. | |
| 8,042,039 B2 | 10/2011 | Anderson | |
| 8,078,881 B1 | 12/2011 | Liu | |
| 8,140,847 B1 * | 3/2012 | Wu | G06F 21/6218 713/175 |
| 8,346,701 B2 | 1/2013 | Wang et al. | |
| 8,364,952 B2 | 1/2013 | Ho et al. | |
| 8,380,511 B2 | 2/2013 | Cave et al. | |
| 8,397,291 B2 | 3/2013 | Miyazaki et al. | |
| 8,489,388 B2 | 7/2013 | Bonnet et al. | |
| 8,505,075 B2 | 8/2013 | Jevans et al. | |
| 8,566,247 B1 | 10/2013 | Nagel et al. | |
| 2001/0037328 A1 | 11/2001 | Pustejovsky et al. | |
| 2001/0054155 A1 * | 12/2001 | Hagan | G06F 21/6254 713/193 |
| 2001/0055388 A1 * | 12/2001 | Kaliski, Jr. | H04L 9/085 380/30 |
| 2002/0067832 A1 | 6/2002 | Jablon | |
| 2002/0111934 A1 | 8/2002 | Narayan | |
| 2002/0111941 A1 | 8/2002 | Roux et al. | |
| 2002/0123946 A1 * | 9/2002 | Haworth | G06Q 10/10 705/35 |
| 2002/0123994 A1 | 9/2002 | Schabes et al. | |
| 2002/0128960 A1 * | 9/2002 | Lambiotte | G06Q 10/04 705/38 |
| 2003/0004828 A1 | 1/2003 | Epstein | |
| 2003/0050959 A1 | 3/2003 | Faybishenko et al. | |
| 2003/0088544 A1 | 5/2003 | Kan et al. | |
| 2003/0105959 A1 | 6/2003 | Matyas, Jr. et al. | |
| 2003/0115458 A1 * | 6/2003 | Song | G06F 21/54 713/165 |
| 2003/0149900 A1 | 8/2003 | Glassman et al. | |
| 2003/0154406 A1 | 8/2003 | Honarvar et al. | |
| 2003/0182584 A1 * | 9/2003 | Banes | G06F 21/34 713/182 |
| 2003/0191627 A1 | 10/2003 | Au | |
| 2004/0006478 A1 * | 1/2004 | Alpdemir | G06Q 30/02 704/275 |
| 2004/0078775 A1 | 4/2004 | Chow et al. | |
| 2004/0133812 A1 | 7/2004 | Ohmori et al. | |
| 2004/0141508 A1 | 7/2004 | Schoeneberger et al. | |
| 2004/0233040 A1 | 11/2004 | Lane et al. | |
| 2004/0255169 A1 | 12/2004 | Little et al. | |
| 2004/0260694 A1 | 12/2004 | Chaudhuri et al. | |
| 2005/0004905 A1 | 1/2005 | Dresden | |
| 2005/0015376 A1 | 1/2005 | Fraser et al. | |
| 2005/0027583 A1 | 2/2005 | Smit et al. | |
| 2005/0044156 A1 | 2/2005 | Kaminski et al. | |
| 2005/0060643 A1 | 3/2005 | Glass et al. | |
| 2005/0096012 A1 | 5/2005 | Borella et al. | |
| 2005/0097320 A1 | 5/2005 | Golan et al. | |
| 2005/0177750 A1 | 8/2005 | Gasparini et al. | |
| 2005/0192792 A1 | 9/2005 | Carus et al. | |
| 2005/0193248 A1 * | 9/2005 | Idei | G06F 11/2076 714/13 |
| 2005/0198537 A1 | 9/2005 | Rojewski | |
| 2005/0235008 A1 | 10/2005 | Camping et al. | |
| 2005/0246534 A1 | 11/2005 | Kirkup et al. | |
| 2005/0251390 A1 | 11/2005 | Catchpole | |
| 2005/0266387 A1 | 12/2005 | Rossides | |
| 2005/0278292 A1 | 12/2005 | Ohi et al. | |

(56) References Cited

U.S. PATENT DOCUMENTS

| | | | |
|---|---|---|---|
| 2005/0287507 A1 | 12/2005 | Inandik | |
| 2006/0026227 A1 | 2/2006 | Shaughnessy et al. | |
| 2006/0037073 A1* | 2/2006 | Juels | G06F 21/31 726/17 |
| 2006/0037075 A1 | 2/2006 | Frattura et al. | |
| 2006/0041932 A1* | 2/2006 | Cromer | H04L 9/3226 726/6 |
| 2006/0168455 A1* | 7/2006 | Kelley | G06F 21/31 713/183 |
| 2006/0235824 A1 | 10/2006 | Cheung et al. | |
| 2006/0277157 A1 | 12/2006 | Seidl et al. | |
| 2006/0282660 A1 | 12/2006 | Varghese et al. | |
| 2006/0287984 A1 | 12/2006 | Chen et al. | |
| 2006/0294390 A1 | 12/2006 | Navratil et al. | |
| 2007/0050638 A1 | 3/2007 | Rasti | |
| 2007/0061871 A1 | 3/2007 | Simpkins et al. | |
| 2007/0074262 A1 | 3/2007 | Kikkoji et al. | |
| 2007/0078973 A1 | 4/2007 | Kussmaul et al. | |
| 2007/0088952 A1 | 4/2007 | Hewitt et al. | |
| 2007/0106499 A1 | 5/2007 | Dahlgren et al. | |
| 2007/0192248 A1 | 8/2007 | West | |
| 2007/0196804 A1 | 8/2007 | Yoshimura et al. | |
| 2007/0208948 A1 | 9/2007 | Costa-Requena et al. | |
| 2007/0219781 A1 | 9/2007 | Roche et al. | |
| 2007/0233611 A1 | 10/2007 | Boyd et al. | |
| 2007/0234343 A1 | 10/2007 | Gouge et al. | |
| 2007/0276623 A1 | 11/2007 | Kund et al. | |
| 2007/0276653 A1 | 11/2007 | Greenwald et al. | |
| 2007/0294229 A1 | 12/2007 | Au | |
| 2008/0010678 A1 | 1/2008 | Burdette et al. | |
| 2008/0016011 A1* | 1/2008 | Moore | G06Q 40/02 705/36 R |
| 2008/0052525 A1* | 2/2008 | Botchek | G06F 21/72 713/184 |
| 2008/0065471 A1 | 3/2008 | Reynolds et al. | |
| 2008/0077799 A1 | 3/2008 | Labaton | |
| 2008/0083021 A1 | 4/2008 | Doane et al. | |
| 2008/0086644 A1* | 4/2008 | Beck | G06F 21/31 713/183 |
| 2008/0097797 A1* | 4/2008 | Morris | G06Q 20/10 705/4 |
| 2008/0127296 A1 | 5/2008 | Carroll et al. | |
| 2008/0133396 A1* | 6/2008 | De La Motte | G06Q 20/10 705/37 |
| 2008/0133671 A1 | 6/2008 | Kalaboukis | |
| 2008/0147788 A1 | 6/2008 | Omoigui | |
| 2008/0149518 A1 | 6/2008 | Macor | |
| 2008/0153595 A1 | 6/2008 | Chickering et al. | |
| 2008/0155619 A1 | 6/2008 | Constantinof | |
| 2008/0175377 A1 | 7/2008 | Merrill | |
| 2008/0201132 A1 | 8/2008 | Brown et al. | |
| 2008/0201133 A1 | 8/2008 | Cave et al. | |
| 2008/0216172 A1 | 9/2008 | Forman et al. | |
| 2008/0222041 A1* | 9/2008 | Mani | G06Q 10/10 705/51 |
| 2008/0243811 A1 | 10/2008 | He et al. | |
| 2008/0294637 A1 | 11/2008 | Liu | |
| 2008/0307040 A1 | 12/2008 | So | |
| 2008/0313461 A1 | 12/2008 | Detienne | |
| 2008/0313721 A1 | 12/2008 | Corella | |
| 2009/0012926 A1 | 1/2009 | Ishikawa et al. | |
| 2009/0018941 A1* | 1/2009 | Gatten | G06Q 30/02 705/35 |
| 2009/0024385 A1 | 1/2009 | Hirsch | |
| 2009/0055642 A1* | 2/2009 | Myers | H04L 63/0869 713/155 |
| 2009/0064101 A1 | 3/2009 | Boss et al. | |
| 2009/0067756 A1 | 3/2009 | Meyer et al. | |
| 2009/0070311 A1 | 3/2009 | Feng | |
| 2009/0080662 A1* | 3/2009 | Thibadeau | G06F 21/31 380/286 |
| 2009/0089876 A1 | 4/2009 | Finamore et al. | |
| 2009/0090662 A1* | 4/2009 | Quinn | C02F 1/008 210/88 |
| 2009/0106134 A1 | 4/2009 | Royyuru | |
| 2009/0106846 A1 | 4/2009 | Dupray et al. | |
| 2009/0112828 A1 | 4/2009 | Rozenblatt | |
| 2009/0113530 A1* | 4/2009 | Brainard | G06F 21/31 726/6 |
| 2009/0119371 A1 | 5/2009 | Chang et al. | |
| 2009/0141986 A1 | 6/2009 | Boncyk et al. | |
| 2009/0144724 A1 | 6/2009 | Little | |
| 2009/0150217 A1 | 6/2009 | Luff | |
| 2009/0158030 A1 | 6/2009 | Rasti | |
| 2009/0158406 A1 | 6/2009 | Jancula et al. | |
| 2009/0171925 A1 | 7/2009 | Elder | |
| 2009/0182728 A1 | 7/2009 | Anderson | |
| 2009/0204594 A1 | 8/2009 | Akkiraju et al. | |
| 2009/0220091 A1 | 9/2009 | Howard | |
| 2009/0226872 A1 | 9/2009 | Gunther | |
| 2009/0241183 A1 | 9/2009 | Boss et al. | |
| 2009/0241201 A1 | 9/2009 | Wootton et al. | |
| 2009/0248665 A1 | 10/2009 | Garg et al. | |
| 2009/0271849 A1 | 10/2009 | Kodama et al. | |
| 2009/0276623 A1* | 11/2009 | Jevans | G06F 21/6209 713/155 |
| 2009/0292687 A1 | 11/2009 | Fan et al. | |
| 2009/0313696 A1 | 12/2009 | Himberger et al. | |
| 2010/0005525 A1* | 1/2010 | Fischer | G06F 21/31 726/21 |
| 2010/0019026 A1 | 1/2010 | Hochfield et al. | |
| 2010/0030579 A1* | 2/2010 | Dhauvan | G06F 19/328 705/3 |
| 2010/0043062 A1* | 2/2010 | Alexander | G06F 21/36 726/6 |
| 2010/0049790 A1 | 2/2010 | Schreiber | |
| 2010/0083371 A1 | 4/2010 | Bennetts et al. | |
| 2010/0114989 A1 | 5/2010 | Cormode et al. | |
| 2010/0161596 A1 | 6/2010 | Yan et al. | |
| 2010/0161601 A1 | 6/2010 | Gruber | |
| 2010/0169244 A1 | 7/2010 | Zeljkovic et al. | |
| 2010/0169338 A1 | 7/2010 | Kenedy et al. | |
| 2010/0180324 A1 | 7/2010 | Karur | |
| 2010/0191686 A1 | 7/2010 | Wang et al. | |
| 2010/0228600 A1* | 9/2010 | Lempel | G06Q 10/063 705/7.11 |
| 2010/0229223 A1 | 9/2010 | Shepard et al. | |
| 2010/0235311 A1 | 9/2010 | Cao et al. | |
| 2010/0250955 A1* | 9/2010 | Trevithick | G06F 21/31 713/185 |
| 2010/0262454 A1 | 10/2010 | Sommer et al. | |
| 2010/0262463 A1 | 10/2010 | Tryfon | |
| 2010/0273139 A1 | 10/2010 | Doppelt et al. | |
| 2010/0275250 A1* | 10/2010 | Devadoss | G06F 21/31 726/6 |
| 2010/0279267 A1 | 11/2010 | Swanson | |
| 2010/0306821 A1* | 12/2010 | Cathcart | G06Q 10/10 726/3 |
| 2011/0029436 A1* | 2/2011 | Norvell | G06F 21/31 705/67 |
| 2011/0202982 A1 | 8/2011 | Alexander et al. | |
| 2012/0291137 A1 | 11/2012 | Walsh et al. | |

FOREIGN PATENT DOCUMENTS

| | | |
|---|---|---|
| WO | WO2005045550 A2 | 5/2005 |
| WO | 2008070894 A1 | 6/2008 |

OTHER PUBLICATIONS

Brainard et al., "Fourth-Factor Authentication: Somebody uou Know", 2006.*

Cutillo et al., "Privacy Preserving Social Networking Through Decentralization", 2009.*

Gong et al., "On the Security of Trustee-based Social Authentications", 2014.*

Javed et al., "Secure Fallback Authentication and the Trusted Friend Attach", 2014.*

Renaud et al., "A Support Architecture for Multi-channel, Multi-factor Authentication", 2014.*

(56) References Cited

OTHER PUBLICATIONS

Soleymani et al., "Social Authentication Protocol for Mobile Phones", May 2009.*
Zhan et al., "Authentication Using Multi-Level Social Networks", 2011.*
"Account Password Recovery, Welcome to the Windows LiveID Account Recovery Help Page," retrieved on May 25, 2010 at <<https://support.live.com/eform.aspx?productKey=wlidvalidation&ct=eformcs&scrx=1>> Microsoft Corporation, 2010, 1 page.
Asgharpour et al., "Adaptive Challenge Questions Algorithm in Password Reset/Recovery," In the First International on Security for Spontaneous Interaction: IWISSI, 2007, 6 pages.
Bellare et al., "Encapsulated Key Escrow," Technical Report, Massachusetts Institute of Technology, available at <<http://citeseerx.ist.psu.edu/viewdoc/summary?doi=10.1.1.137.367>> 1996, 28 pages.
Bojars et al., "Using the Semantic Web for linking and reusing data across Web 2.0 communities," Journal of Web Semantics, Elsevier B.V., 2007, pp. 21-28.
Brainard et al., "Fourth-Factor Authentication: Somebody You Know," retrieved on May 24, 2010 at <<http://www.google.co.in/search?hl=en&source=hp&q=Fourth-factor+authentication%3A+somebody+you+know&aq=f&aqi=&aql=&oq=&gs_rfai=>> ACM, Proceedings of Conference on Computer and Communications Security (CCS), Alexandria, VA, 2006, pp. 168-178.
Brostoff et al., "'Ten strikes and you're out': Increasing the number of login attempts can improve password usability," retrieved on May 24, 2010 at <<http://www.andrewpatrick.ca/CHI2003/HCISEC/hcisec-workshop-brostoff-2.pdf>> John Wiley, Proceedings of Workshop on Human-Computer Interaction and Security Systems (CHI), Fort Lauderdale, FLA, Apr. 2003, pp. 1-4.
Cambridge University Press, "Edit distance," retrieved on Sep. 29, 2011 at <<http://nlp.stanford.edu/IR-book/html/mtledition/edit-distance-1.html>> 3 pages.
Chen et al., "A maximum entropy approach to feature selection in knowledge-based authentication," Decision Support Systems, vol. 46, Elsevier B.V., 2008, pp. 388-398.
Chen et al., "Bayesian Networks for Knowledge-Based Authentication," IEEE Transactions on Knowledge and Data Engineering, vol. 19, No. 5, IEEE 2007, pp. 695-710.
"Contact Us—Google Accounts Help," retrieved on May 25, 2010 at <<http://www.google.com/support/accounts/bin/request.py?hl=en&contact_type=ara&ctx=account&uses_apps=no&product=other&submit=continue>> Google, 2010, pp. 1-2.
Fox, "It's all in the atmosphere," HeinOnline-62 Fordham L., vol. 62, 1993, 7 pages.
Garfinkel, "Email-Based Identification and Authentication: An Alternative to PKI?" IEEE Computer Society, 2003, 7 pages.
"Hacker impersonated Palin, Stole E-Mail Password," retrieved on May 24, 2010 at <<http://www.breitbart.com/article.php?id=D939AO101>> The Associated Press, 2008, pp. 1-2.
Heilman, "Liability of the Trustee for the Acts of His Delegate," HeinOnline—Dick L. Rev. 260, Dickinson Law Review, 1947, 13 pages.
Innerhofe-Oberperfler, "Using Approximate String Matching Techinques to Join Street," Jun. 15, 2004, Free University of Bolzano-Bozen, pp. 1-28.
Jakobsson et al., "Love and Authentication," retrieved on May 24, 2010 at <<http://www.ravenwhite.com/files/chi08JSWY.pdf>> ACM, Proceedings of Conference on Human Factors in Computing Systems (CHI), Florence, IT, Apr. 2008, pp. 197-200.
Karnin et al., "On Secret Sharing Sytems," IEEE Transaction on Information Theory, vol. IT-29, No. 1, Jan. 1983, 7 pages.
Kent, "Privacy Enhancement for Internet Electronic Mail: Part II: Certificate Based Key Management," Oct. 14, 2012 at <http://tools.ietf.org/htmal/rfc1422> RFC 1422, Feb. 2003, 32 pages.

Landru et al., "Protecting a Potential Pensioner's Pension—An Overview of Present and Proposed Law on Trustees' Fiduciary Obligations and Vesting," Brooklyn Law Review, vol. 40, No. 3., 1974, 61 pages.
Merriam-Webster online dictionary, "computer," retrieved at <<http://www.merriam-webster.com/dictionary/computer>> Merriam-Webster Dictionary, 2015, 1 page.
"NetBank—Demos overview—Commonwealth Bank," retrieved on May 24, 2010 at <<http://www.commbank.com.au/netbank/netcodesms/>> Commonwealth Bank of Australia, 2010, p. 1.
O'Gorman et al., "Query-directed passwords," Computers & Security, vol. 24, Elsevier Ltd., 2005, pp. 546-560.
Office action for U.S. Appl. No. 12/466,257, dated Aug. 30, 2013, Schechter et al., "Evidence-Based Dynamic Scoring to Limit Guesses in Knowledge-Based Authentication," 31 pages.
Non-Final Office Action for U.S. Appl. No. 12/466,246, dated Oct. 11, 2011, Stuart Schechter, "Social Authentication for Account Recovery," 29 pages.
Non-Final Office Action for U.S. Appl. No. 12/466,257, dated Oct. 11, 2011, Stuart Schechter, "Evidence-Based Dynamic Scoring to Limit Guesses in Knowledge-Based Authentication," 41 pages.
Office action for U.S. Appl. No. 12/466,246, dated Nov. 9, 2012, Schechter et al., "Social Authentication for Account Recovery," 64 pages.
Office action for U.S. Appl. No. 12/466,257, dated Dec. 30, 2013, Schechter et al., "Evidence-Based Dynamic Scoring to Limit Guesses in Knowledge-Based Authentication," 32 pages.
Office Action for U.S. Appl. No. 12/466,246, dated Mar. 1, 2012, Stuart Schechter, "Social Authentication for Account Recovery," 52 pages.
Office Action for U.S. Appl. No. 12/466,257, dated Mar. 15, 2012, Stuart Schechter, "Evidence-Based Dynamic Scoring to Limit Guesses in Knowledge-Based Authentication," 48 pages.
Office action for U.S. Appl. No. 12/466,257, dated Mar. 21, 2013, Schechter et al., "Evidence-Based Dynamic Scoring to Limit Guesses in Knowledge-Based Authentication," 44 pages.
Office action for U.S. Appl. No. 12/466,246, dated Apr. 22, 2013, Schechter et al., "Social Authentication for Account Recovery," 71 pages.
Non-Final Office Action for U.S. Appl. No. 12/466,257, dated Jun. 27, 2014, Stuart Schechter, "Evidence-Based Dynamic Scoring to Limit Guesses in Knowledge-Based Authentication," 21 pages.
Podd et al., "Cost-effective Computer Security: Cognitive and Associative Passwords," retrieved on May 24, 2010 at <<http://www.computer.org/plugins/dl/pdf/proceedings/ozchi/1996/7525/00/75250304.pdf?template=1&loginState=1&userData=anonymous-IP%253A%253AAddress%253A%2B203.8.109.15%252C%2B%255B172.16.161.4%252C%2B203.8.109.15%252C%2B127.0.0.1%255D>> IEEE Proceedings of Australian Conference on Computer-Human Interaction (OZCHI), 1996, pp. 304-305.
Rabkin, "Personal knowledge questions for fallback authentication: Security questions in the era of Facebook," retrieved on May 24, 2010 at <<http://cups.cs.cmu.edu/soups/2008/proceedings/p13Rabkin.pdf>> ACM, Proceedings of Symposium on Usable Privacy and Security (SOUPS), Pittsburgh, PA, Jul. 2008, pp. 13-23.
Risson et al., "Survey of research towards robust peer-to-peer networks: Search methods," Computer Networks, vol. 50, Elsevier B.V., 2006, pp. 3485-3521.
Rosenfeld, "A maximum entropy approach to adaptive statistical language modelling," Computer Speech and Language, vol. 10, Academic Press Limited, 1996, pp. 187-228.
Schechter et al., "It's no secret, Measuring the security and reliability of authentication via 'secret' questions," retrieved on May 24, 2010 at <<http://guanotronic.com/~serge/papers/oakland09.pdf>> IEEE Symposium on Security and Privacy, May 2009, pp. 375-390.
Schechter et al., "It's Not What You Know, But Who You Know—A Social Approach to Lase-Resort Authentication," In the Proceedings of the 27th International Conference on Human Factors in Computing Systems, 2009, pp. 1983-1992.
Tsai et al., "Exploiting Full Parsing Information to Label Semantic Roles Using an Ensemble of ME and SVM via Integer Linear

(56) References Cited

OTHER PUBLICATIONS

Programming," Proceedings of the 9th Conference on Computational Natural Language Learning (CoNLL), Association for Computational Linguistics, 2005, pp. 233-236.
Van Vesor Wolf et al., "Trustee Environmental Liability: Avoiding the Quagmire," Environmental Claims Journal, vol. 6, 1994, 1 page.
Vu et al., "Improving password security and memorability to protect personal and organizational information," retrieved on May 24, 2010 at <<http://homes.cerias.purdue.edu/~bhargav/pdf/VulJHCS07.pdf>> Elsevier Ltd., International Journal of Human-Computer Studies, vol. 65, 2007, pp. 744-757.
Zviran et al., "User Authentication by Cognitive Passwords: an Empirical Assessment," retrieved on May 24, 2010 at <<http://ieeexplore.ieee.org/stamp/stamp.jsp?arnumber=00128279>> IEEE Proceedings of Conference on Information Technology, Jerusalem, IL, Oct. 1990, pp. 137-144.
"Account Password Recovery, Welcome to the Windows LiveID Account Recovery Help Page," retrieved on May 25, 2010 at <<https://support.live.com/eform.aspx?productKey=wlidvalidation&ct=eformcs&scrx=1>>, Microsoft Corporation, 2010, p. 1.
Asgharpour et al., "Adaptive Challenge Questions Algorithm in Password Reset/Recovery," In the First International Workshop on Security for Spontaneous Interaction: IWISSI, 2007, 6 pages.
Brostoff et al., "'Ten strikes and you're out': Increasing the number of login attempts can improve password usability," retrieved on May 24, 2010 at <<http://www.andrewpatrick.ca/CHI2003/HCISEC/hcisec-workshop-brostoff-2.pdf>> John Wiley, Proceedings of Workshop on Human-Computer Interaction and Security Systems (CHI), Fort Lauderdale, FL, Apr. 2003, pp. 1-4.
Cambridge University Press, "Edit distance," retrieved on <<http://nlp.stanford.edu/IR-book/html/mtledition/edit-distance-1.html>> on Sep. 29, 2011, 3 pages.
Kent, "Privacy Enhancement for Internet Electronic Mail: Part II: Certificate Based Key Management," Oct. 14, 2012, at <<http://tools.ietf.org/htmal/rfc1422>> RFC 1422, Feb. 2003, 32 pages.
"NetBank—Demos overview—Commonwealth Bank," retrieved on May 24, 2010 at <<http://www.commbank.com.au/netbank/netcodesms/>> Commonwealth Bank of Australia, 2010, pp. 1.
Non-Final Office Action for U.S. Appl. No. 12/466,257, dated Oct. 11, 2011, Stuart Schechter, "Evidence-Based Dynamic Scoring to Limit Guesses in Knowledge-Based Authentication", 41 pages.
Office action for U.S. Appl. No. 12/466,257, dated Dec. 30, 2013, Schechter et al., "Evidence Based Dynamic Scoring to Limit Guesses in Knowledge-Based Authentication," 32 pages.
Rabkin et al., "Personal Knowledge Questions for Fallback Authentication: Security Questions in the Era of Facebook," In the Proceedings of the 4th Symposium on Usable Privacy and Security, 2008, pp. 13-23.
Van Vesor Wolf etal., "Trustee Enviornmental Liability: Avoiding the Quagmire," Environmental Claims Journal, vol. 6, 1994, 1 page.
"Reset Friend Password", Retrieved From: <<https://friend.weblogin.umich.edu/friend/account/>>, Nov. 15, 2005, 1 Page.

\* cited by examiner

500

502

Search

Sign to verify your previous answers

504

We are asking you to pledge to the following statement because false answers put Account Holder at risk of account theft.

506

Enter your legal name below

Do solemnly swear that I will call Account Holder and only provide the access code for his account after I reach him in person. I will not leave the code by voicemail unless he instructed me to do so in his own voice.

508

Go back
I'm not comfortable making the promise and want to review my choices.

Cancel this request
On second thought, I now suspect the request was a scam.

I promise that my pledge above is true
I will accept responsibility, if a false statement results in a compromise of my friend's account.

Help me understand this choice
I'd like to better understand the decision before making it.

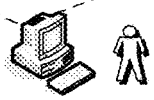

TRUSTEE 104

*Fig. 5*

SOCIAL AUTHENTICATION FOR ACCOUNT RECOVERY

RELATED APPLICATIONS

This application is a continuation of U.S. patent application Ser. No. 12/466,246, filed on May 14, 2009, and entitled "Social Authentication for Account Recovery," the entirety of which is incorporated herein by reference.

BACKGROUND

In an online computing environment, backup authentication mechanisms help users or account holders who have forgotten their passwords regain access to their accounts. The security and reliability of today's backup authentication mechanisms have significant room for improvement.

Website accounts have typically allowed access thereto by authenticating account holders using credentials that are either memorized or stored, e.g. passwords or smartcards, by the users. In such a system, there are always account holders that will forget or lose these memorized or stored credentials.

Passwords are frequently used as a means of primary authentication, meaning passwords are the typical day-to-day means for accessing an account holder's account. Some password mismatches result when account holders mistype passwords or cannot remember which of their passwords to use.

Modern web browsers have integrated password managers that remember and enter account holders' passwords for them. Those who use these features need not enter their passwords as often, and thus may be less likely to remember their passwords when they do need to enter them. These account holders may resort to backup authentication if they lose the data in their password managers, replace their computers, or start working from new computers.

Existing backup systems may use 'secret' personal questions and alternate email addresses for backup authentication in the event users forget or loses his access credentials. However, these methods are frequently unreliable. For personal questions, users often forget their answers, especially when answers are case and punctuation sensitive. It is also common for acquaintances of the respective users to be able to guess the answers, even acquaintances not closely associated with the respective account holders or users. In existing methods, many times the questions are not applicable to the general public, not memorable, ambiguous, easily guessable with no knowledge of the account holder, or easily guessable with minimal knowledge of the account holder.

An account holder who tries to authenticate an account using an alternate email address many times finds that the configured address expired upon a change of job, school or Internet service provider. Since other websites rely on email addresses to authenticate their account holders when passwords fail, it is especially important for webmail providers to have a secure and reliable authentication mechanism of last resort.

The ubiquity of mobile phones has made them an attractive option for backup authentication. Some entities already send SMS messages containing authorization codes to supplement primary authentication for high-risk transactions. However, authenticating users by their mobile phones alone is risky as phones are frequently shared or lost.

Some websites offer last-resort backup authentication through their customer-support departments. However, introducing human customer support teams may not provide a strong advantage over automated systems, as information used by support staff to authenticate account holders may be no better than the information available to the automated systems.

The concept of shifting the responsibility to authenticate an individual from one party to another is not new. Authenticating users via alternate email addresses shifts the responsibility to authenticate to the providers of those alternate addresses. In organizations, the responsibility to authenticate users who fail primary authentication is often shifted to system administrators, corporate security, or other support staff Other systems have used a two-factor primary authentication system (PIN and token) for enterprise use in which account holders who lose tokens can receive help from a pre-selected trustee called a "helper." In this system, the trustee authenticates using the two factors, PIN and token, in order to generate a "vouchcode" that substitutes for the account holder's lost token. This system is designed for primary authentication and it cannot be assumed that a system administrator is always available if the system fails and a backup authentication is necessary. This system requires the system administrator or trustee to be on the same system as the account holder.

SUMMARY

A social authentication system for backup account recovery is described. The backup account recovery system provides for an account holder to obtain his or her password in the event the account holder is unable to gain access to an account using the primary authentication method. The social authentication system allows the account holder to contact several trustees that were previously selected and identified.

Upon being unable to gain access to an account, the account holder contacts one or more trustees to inform them that the account holder needs to regain access to the account and therefore needs to obtain an account recovery code from each trustee. Each trustee may then contact the account recovery system which resides in servers accessible on the Internet. The account recovery system then verifies that the trustee's contact information matches that of a previously identified trustee for the specified account holder. Once the trustee's contact information has been verified to match that of a previously identified trustee for the specified account holder, the account recovery system begins a back and forth dialog with the trustee, whereby the trustees provide information, transmit a link and code provided by the account recovery system, vouch for their contact with the account holder and pledge that the statements they have provided are accurate and that the trustees agree on the course of action. Once this dialog is successfully completed, each trustee is provided with a unique account recovery code, which is then provided to the account holder. Once the required number of account recovery codes has been received, the account holder is able to use them to obtain access to the account.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

Figure 1:
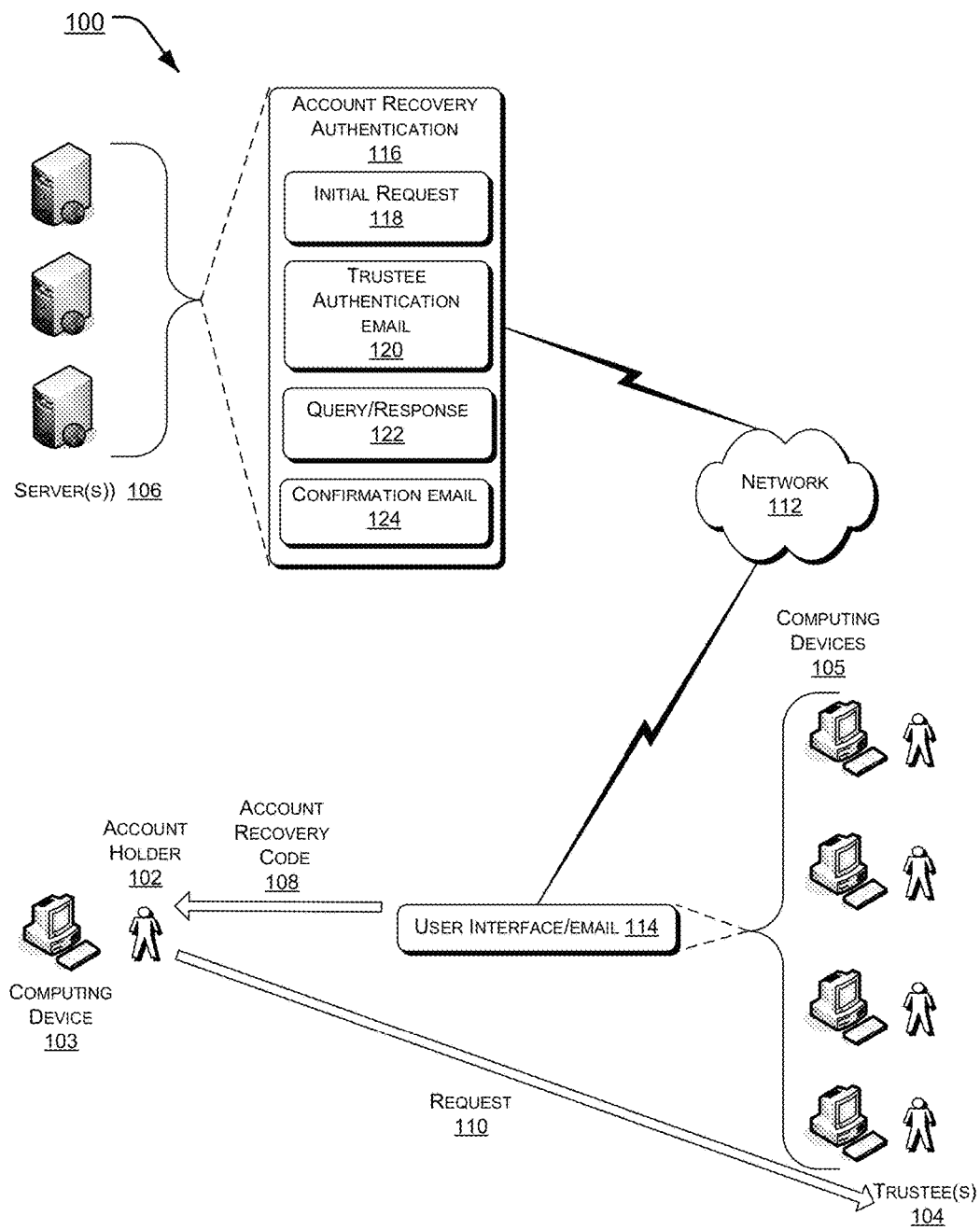
FIG. 1 depicts an illustrative architecture that implements an account recovery system using social authentication.
Figure 4:
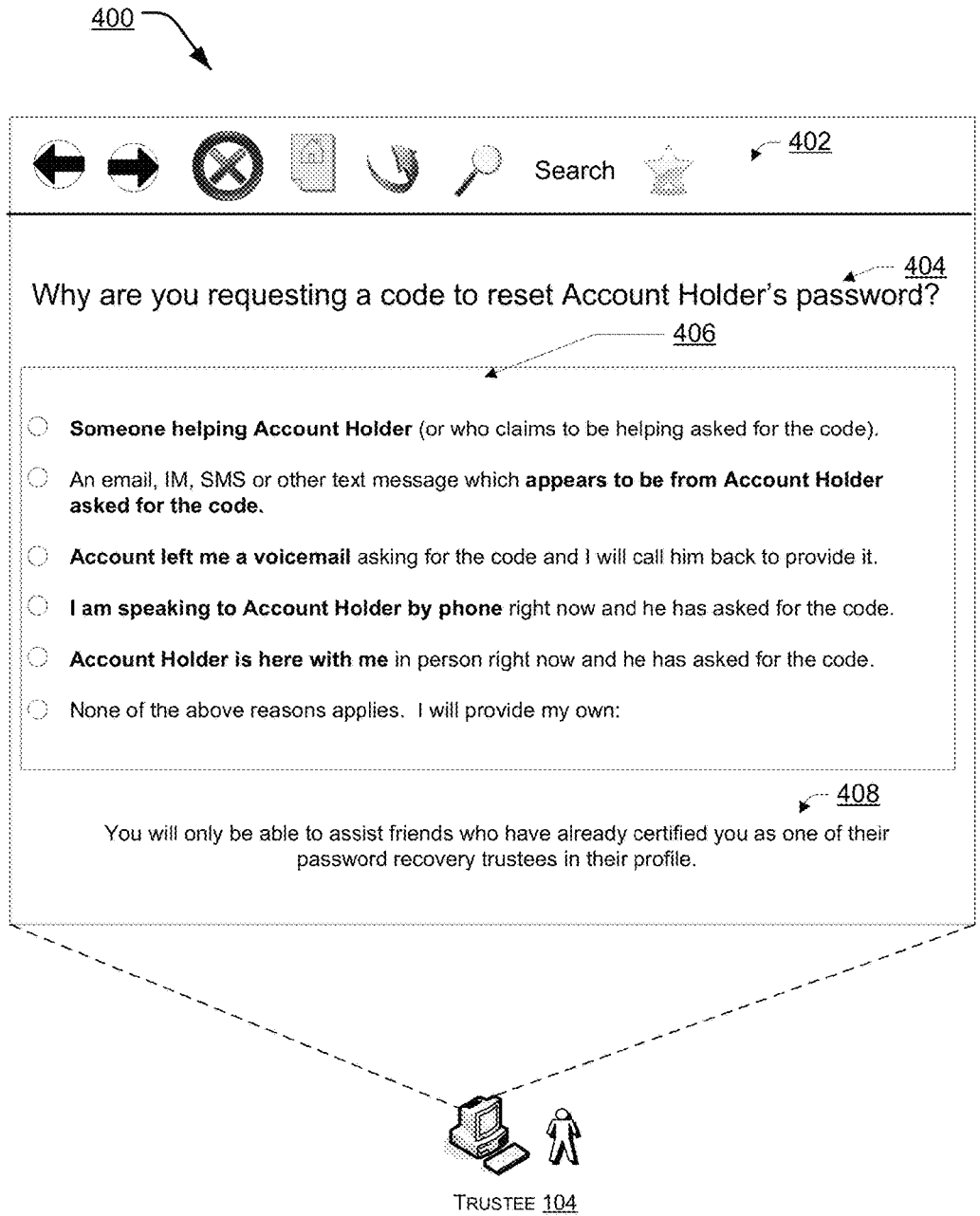

FIG. 4 an illustrative example of one aspect of the trustee/server interaction for the implementation of the architecture of FIG. 1.

FIG. 5 an illustrative example of one aspect of the trustee/server interaction for the implementation of the architecture of FIG. 1.

Figure 6:
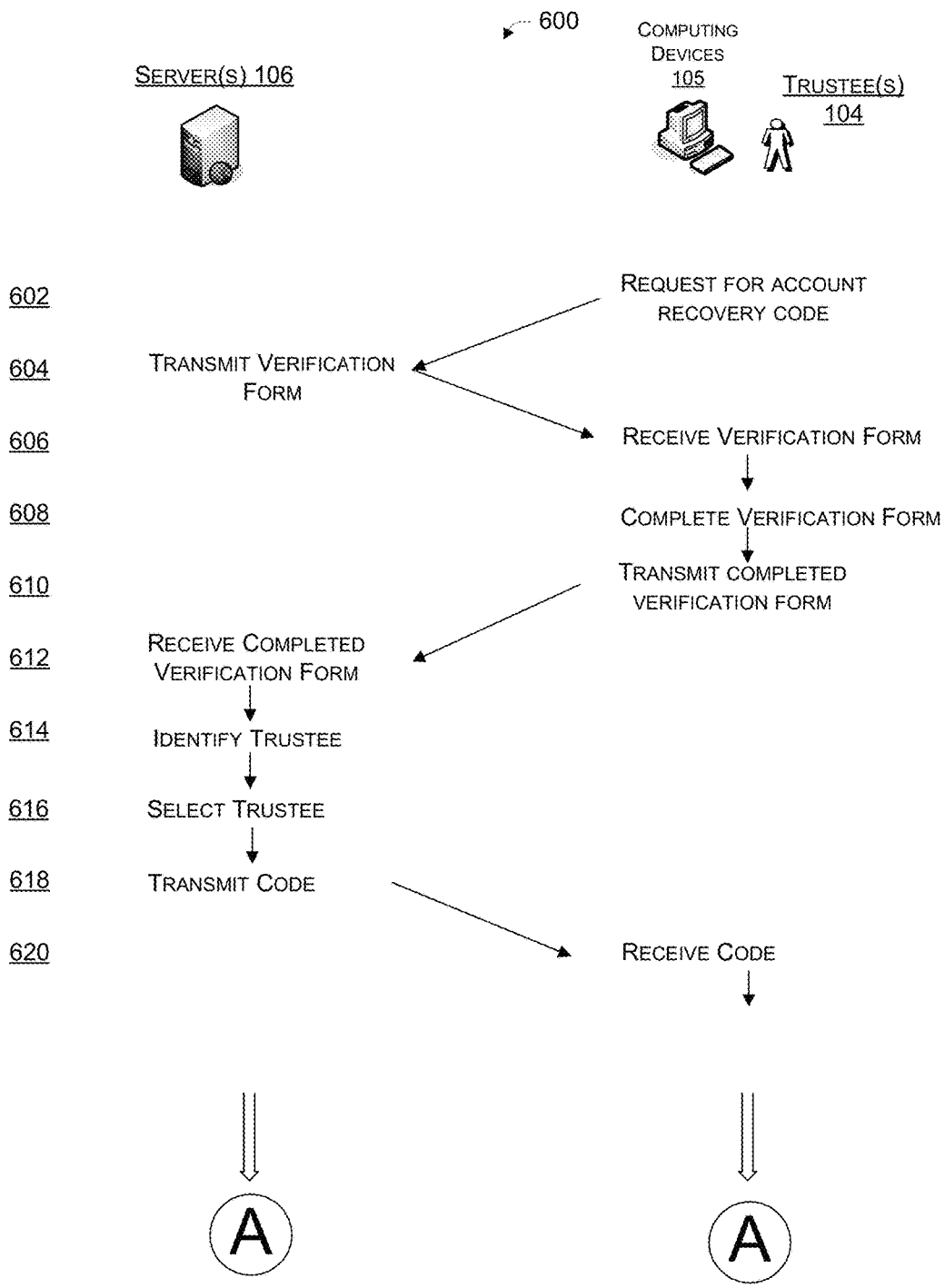
Figure 7:
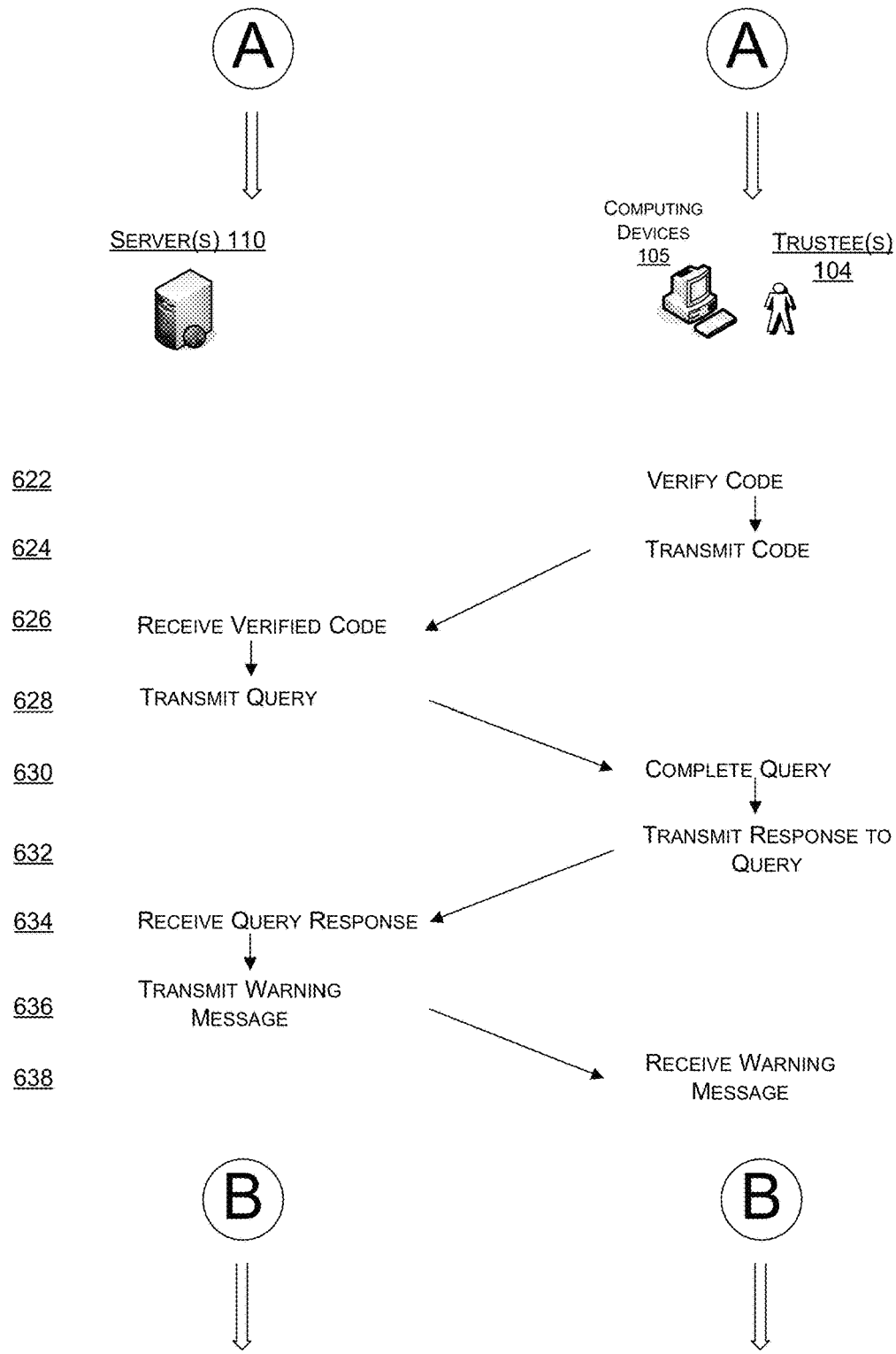
Figure 8:
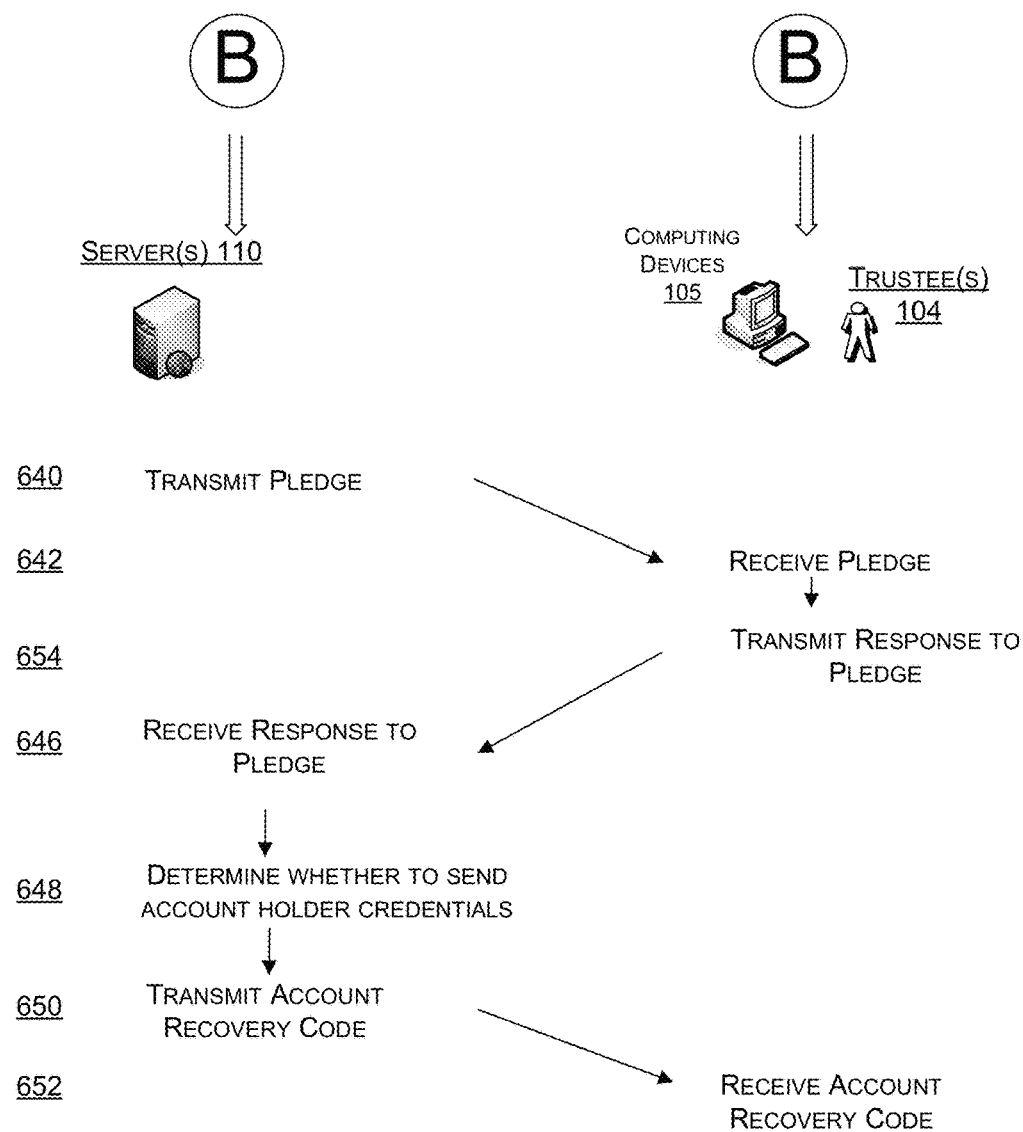

FIGS. 6-8 are flow diagrams of illustrative processes for performing the account recovery system interaction for the implementation of the architecture of FIG. 1.

DETAILED DESCRIPTION

Overview

This document describes a complete social authentication system for backup account recovery. The social authentication system is a system in which account holders initially appoint and later rely on account trustees to help them authenticate. To regain access to their accounts, account holders contact their trustees by phone or in person, so that their trustees may recognize them by their appearance or voice. A trustee who recognizes an account holder may provide the account holder with an account recovery code once the trustee has accessed the account recovery system and complied with its various requirements. An account holder must present a sufficient number of these codes (e.g. two codes from any of four possible trustees) to authenticate.

The overall success of any authentication system depends on four measurement categories:

Setup and maintenance costs: The time or effort required of the account holder to configure or reconfigure the authentication system.

Efficiency: The time or effort required of the account holder each time he or she authenticates to the system.

Reliability: The likelihood that the account holder can successfully authenticate his or her identity.

Security: The time or effort required to impersonate (falsely authenticate as) an account holder, or likelihood of doing so successfully.

Reliability is especially important for a backup authentication system of last resort. Account holders that need to use a backup authentication system of last resort may have no other chance to regain access to their accounts. If a backup authentication system is less secure than the primary mechanism it supports, its very existence will make users' accounts less secure. Fortunately, backup authentication occurs less often than primary authentication, and efficiency may be sacrificed to achieve reliability and security. While the system described below addresses all four measurement categories, it is more focused on the reliability and security aspects.

Illustrative Architecture

FIG. 1 depicts an illustrative architecture that provides a backup account recovery system of last resort using social authentication. As illustrated, the architecture 100 includes an account holder 102 and a computing device 103. The account holder 102 initially configures a backup account recovery system of last resort by identifying and selecting several trustees 104, each having one or more computing devices 105, to participate in the account recovery system in the event the primary means of accessing an account is unavailable. Computing devices 103 and 105 include personal computers, mobile phones, personal digital assistants (PDAs) and similar devices. Once the trustees 104 are selected by the account holder 102, information for each of the trustees is sent to servers 106 which implement the account recovery system. The information for each of the trustees is stored on the servers 106 for use in the event the account recovery system is utilized. This configuration process sets up the backup account recovery system for use in the event it becomes necessary due to a lost password or other such event that renders the primary authentication process for account holder 102 to be unavailable.

The account recovery system of FIG. 1 is designed, built, and deployed employing social authentication, in which an account holder 102 can access an account by obtaining account recovery codes from a pre-determined number of trustees 104 from the total originally configured. Typically, in order to exact a compromise between security and efficiency, three of four previously selected trustees is used. However, any number of trustees required to return an account recovery code and any total number of trustees can be utilized depending on the level of security desired by account holder 102 or required by a facilitator of the account recovery system. The primary threat to a social authentication system is that an attacker, i.e. someone other than the account holder, will convince or trick the account holder's trustees to vouch that the attacker is the account holder. That is, the attacker would request and receive the information required to obtain an account recovery code. The attacker might do this by impersonating the account holder or by convincing the trustee that he or she is acting on behalf of the account holder. The descriptions below will further describe aspects of the account recovery system that mitigate these attacks.

The account recovery system may also work with as few as one trustee when it is combined with other mechanisms for authenticating the account holder. For example, the account holder might be able to recover an account by answering a personal authentication question and obtaining a single account recovery code. Likewise, a as few as one account recovery code from one trustee may be used in combination with an old account password or a printed code sheet stored in a safe.

In the event an account holder needs to recover an account, the account holder 102 obtains account recovery codes 108 from the trustees 104. An account holder 102 initiates a request 110 to the trustees 104 that instructs them to visit the account recovery system via the network 112 at some network or Internet address provided by the account holder 102 to the trustees 104. Account holders 102 should contact trustees using methods that allow the trustees 104 to verify their identity. Such methods include either voice or visual appearance, i.e., in person, by telephone, by video teleconference, etc. The request 110 alerts the trustees 104 to the fact that account recovery codes 108 must be obtained for account holder 102. Again, depending on the level of security required, the trustees 104 can receive the request 110 from the account holder 102 in-person or by telephone. These methods are preferred in the case of higher levels of security. If security is less critical and expedience is more important, the user interface/email method 114 may be used.

After receiving the request 108 from the account holder 102, the trustees 104 individually contact the network or Internet address provided by the account holder 102. This communication begins the account recovery authentication process 116 located on servers 106. The account recovery authentication process 116 begins with the initial request process 118. After the request 108 is received by the servers 106, the initial request process 118 sends an email or other type of communication to the trustee 104. The trustee 104 is asked to enter the trustee's own email address as well as the address of the account holder 102 the trustee 104 is assisting. An illustrative example of this screen is set forth in FIG. 2.

Figure 2:
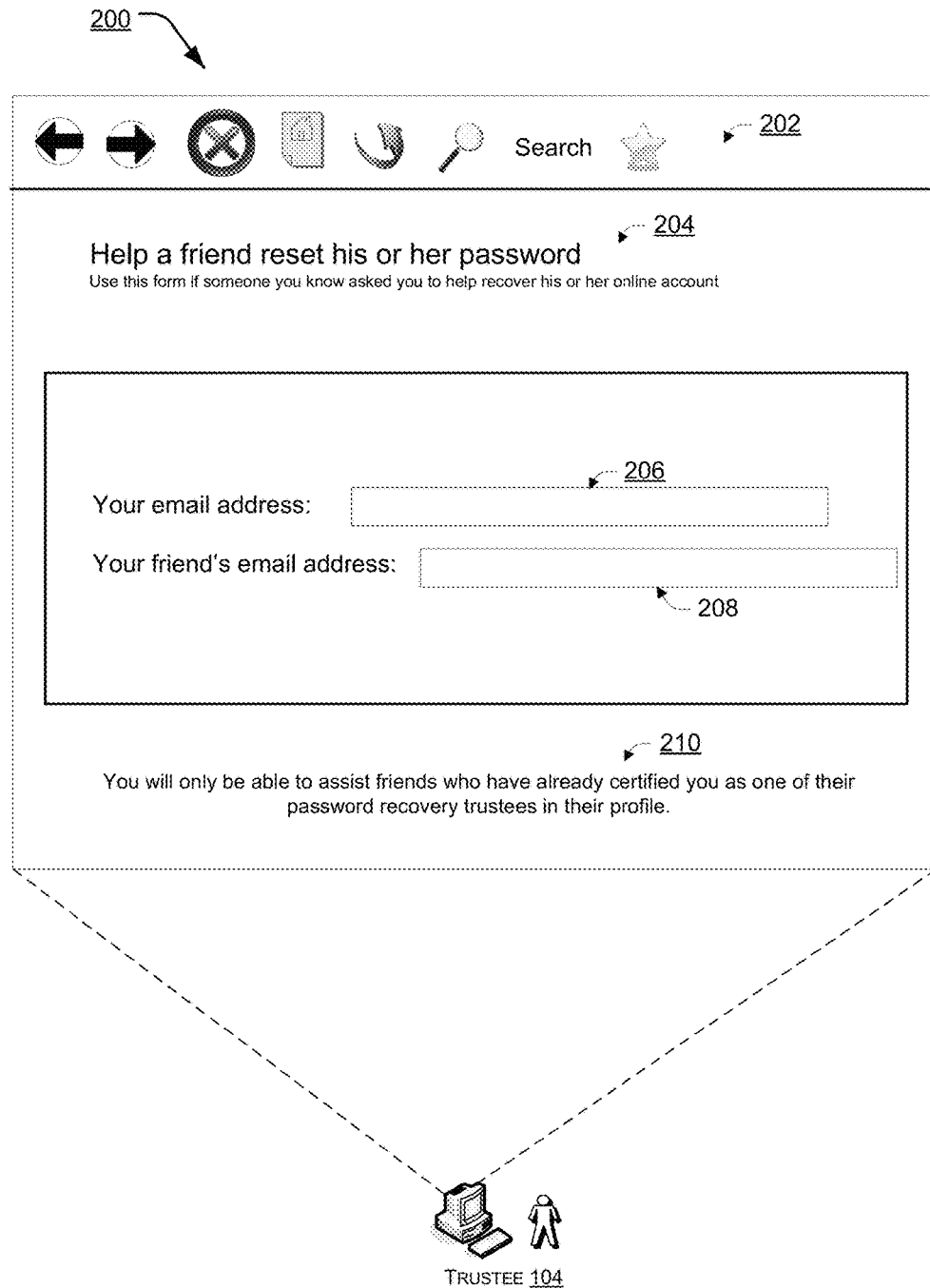
FIG. 2 depicts an illustrative example of one aspect of the trustee/server interaction for the implementation of the architecture of FIG. 1.

FIG. 2 is a representative communication to the trustee 104 that includes a user interface 200 with a menu features box or toolbar 202. An explanation text box 204 may include a message such as "Help a friend reset his or her password" or such other language that provides the recipient with an explanation for the purpose of the communication. Trustee email text box 206 provides an input area for the trustee's 104 email address while account holder email text box 208 provides an input area for the account holder's email address. Message text box area 210 provides an additional area for messages to be communicated. In one example, the communication states: "You will only be able to assist friends who have already certified you as one of their password recovery trustees in their profile." Other language may be used or other messages communicated as may be necessary.

Referring back to FIG. 1, after the trustee 104 completes the information requested on the email, the trustee 104 returns the email to the servers 106. The initial request process 118 then checks the information against a database where information for each of the trustees 104 is stored. If the information matches the information in the database, an email is sent to the computing device 105 for the trustee 104 as part of the trustee authentication email process 120.

Figure 3:
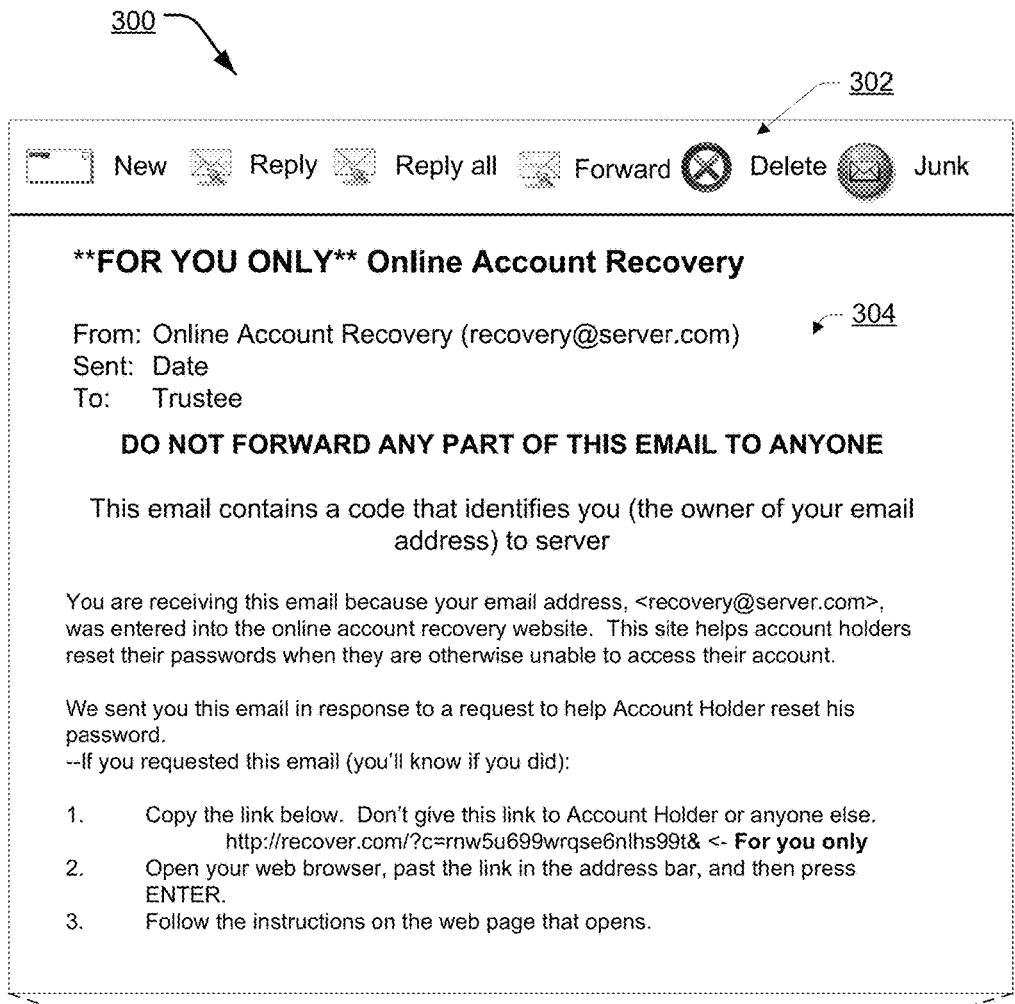
FIG. 3 depicts an illustrative example of one aspect of the trustee/server interaction for the implementation of the architecture of FIG. 1

FIG. 3 is a representative communication sent to the trustee 104 as described above. The communication includes a user interface 300 and a menu features box or toolbar 302. Instruction text box area 304 provides instructions to the trustee 104 to continue the trustee authentication email process 120. The language used in the communication and the messages to be conveyed may vary, however, the communication generally provides instructions for handling a link and code that is sent to the trustee 104. In one example, the language may state the following (as shown for illustrative purposes in FIG. 3): "1. Copy the link below. Don't give this link to Account Holder or anyone else. http://recover.com/?c=mw5u699wrqse6nlhs99t& <- For you only.; 2. Open your web browser, past the link in the address bar, and then press ENTER.; and 3. Follow the instructions on the web page that opens." This language may be written in different forms as long as the basic message and code are conveyed. In the illustrations, the words "Account Holder" are used in locations where the system would write the name of the account holder.

The codes used to authenticate trustees 104 may be contained in a web link as described above. However, the codes do not need to be specific to web links. The trustee 104 may also be asked to copy the code alone and send the code via SMS message or another similar type of communication where the code would be then be entered into a web page.

Referring back to FIG. 1, if the information does not match the information in the database, the respective trustee 104 will be notified and the process of obtaining an account recovery code will be terminated. In some instances, depending on the level of security desired, the respective trustee 104 may be given another opportunity to provide the information.

The trustee authentication email process 120 also causes the servers to create a record to track the request and the email sent to the respective trustee 104 will contain a code pointing to this record. The trustee copies this link into her browser's address bar to continue. This emailed link and code are all that are required to prove the trustee's identity and retrieve the account recovery code 108. An attacker who could convince a trustee 104 to forward the email would be able to retrieve the code. Two countermeasures against this attack are the email's subject, which may begin with a message such as, but not limited to, "FOR YOU ONLY", and the message body, which begins with a conspicuous warning such as, but not limited to, "do not forward any part of this email to anyone" as shown in FIG. 3. As stated earlier and will be described in more detail in FIGS. 6-8, there are some additional measures used to deter attacks on the system and make it much more robust.

When the trustee 104 pastes the link from the trustee-authentication email process 120 into her browser, the trustee 104 is asked to explain why an account recovery code 108 is being requested by choosing from a set of options that are set forth in the query/response process 122. FIG. 4 is a representative communication sent to the trustee 104. The communication includes a user interface 400 and a menu features box or toolbar 402. Message text box area 404 includes a message stating why the communication was sent to the trustee 104. In the example, the message asks a question and discloses its purpose by stating "Why are you requesting a code to reset Account Holder's password?" Answer text box 406 provides answers or other information related to the message text box information 404. In the illustrative example in FIG. 4, the listed items include: "Someone helping [the account holder's name goes here] (or who claims to be helping asked for the code.), An email, IM, SMS or other text message which appears to be from [the account holder's name goes here] asked for the code, [the account holder's name goes here]left me a voicemail asking for the code and I will call him back to provide it, I am speaking to [the account holder's name goes here]by phone right now and he has asked for the code, [the account holder's name goes here] is here with me in person right now and he has asked for the code, or None of the above reasons applies. I will provide my own." This is just one example of the language that may be used and the language may be continually updated as different threat scenarios are identified and thus, different information is needed. The words General text box 408 provides an area where additional messages may be communicated to the trustee 104. An illustrative example is "You will only be able to assist friends who have already certified you as one of their password recovery trustees in their profile." It is contemplated that many different messages may be communicated to the trustee 104 in this area.

Referring again to FIG. 1, these options may convey that the trustee 104 has heard from the account holder 102 personally or that the trustee 104 is responding to a request from a third party. The options that indicate the highest risk of fraud are listed at the top in order to maximize the chance that the trustee 104 will read them before making a choice. If the trustee 104 chooses either of the top two options, a warning page is sent to the trustee 104 that describes telltale signs of fraud and encourages the trustee 104 to contact the account holder 102 by phone or in person. The trustee 104 may, however, be given the option to disregard these warnings and continue. The number of options and the specific options which generate warning messages when selected can be varied both in number and location. Further, the options may be periodically updated.

Finally, a confirmation process 124 is initiated. The respective trustee 104 is asked to provide a pledge asserting that the trustee's previous answers are correct and that the respective trustee 104 understands the potential consequences of giving an account recovery code 108 to someone other than the account holder 102. As an example of confirmation to be entered by the respective trustee 104, the pledge may require the trustee 104 to type the name of the trustee 104, as provided by the account holder 102, and to press a button that says "I promise the above pledge is true". For example, if a trustee 104 reports receiving a request 110 from the account holder 102 via voicemail, the trustee 104 would be asked to pledge that the trustee 104 will only provide a code after the account holder is reached "in person."

FIG. 5 is a representative communication the trustee 104 receives for communication back to the servers (once completed) to provide a pledge to verify the answers provided on the previous communications described in FIGS. 2, 3 and 4 above. The communication includes a user interface 500 and a menu features box 502. Message text area 504 provides a section to explain the purpose of the communication. In one example, the message may state: "Sign in to verify your previous answers. We are asking you to pledge to the following statement because false answers put Account Holder at risk of account theft." This language and the content of the message may be in many different forms. Pledge text box 506 contains the actual pledge language and provides a space for entering the trustee's 104 legal name. One example of pledge language may state: "Do solemnly swear that I will call [the account holder's name goes here] and only provide the access code for his account after I reach him in person. I will not leave the code by voicemail unless he instructed me to do so in his own voice." The pledge language may be structured and stated in many different ways. Finally, procedural text box 508 provides the trustee 104 with different ways to proceed once the pledge has been "signed." One example is shown in FIG. 5 and allows the trustee to "Go back" or "Cancel this request" or "promise that my pledge above is true" or "Help me understand this choice." Other scenarios and language for the ways in which to proceed may be contemplated for this text box area 508.

Referring once again to FIG. 1, after the respective trustee 104 has signed the pledge, the system presents the six character account recovery code 108, although account recovery code 108 is by no means limited to six characters. If this is the first account recovery code 108 requested for this account holder 102, the account recovery authentication system 116 may then send email to the remaining trustees 104 to notify them of the event and encourage them to call the account holder. To further protect against attack, the account holder 102 will be notified immediately if the account holder 102 is already online or whenever the account holder 102 next logs in. Upon notification, the account holder is able to abort the process and protect his account from further attack. Also, if an attack were underway, a call from the account holder's trustees 104 would alert the account holder to login and halt the recovery process before the attacker can complete it.

Illustrative Flow Diagram

FIGS. 6-8 depict an illustrative process 600 for implementing the backup account recovery authentication process that may be implemented by the architecture of FIG. 1 and/or by other architectures. This process 600 is illustrated as a collection of blocks in a logical flow graph, which represent a sequence of operations that can be implemented in hardware, software, or a combination thereof In the context of software, the blocks represent computer executable instructions that, when executed by one or more processors, perform the recited operations. Generally, computer-executable instructions include routines, programs, objects, components, data structures, and the like that perform particular functions or implement particular abstract data types.

FIGS. 6-8 illustrate the sequence of events in a backup account recovery system using social authentication. Process 600 includes operation 602 in which a request is transmitted by the trustee 104 to a server 106 to inform the server 106 that the trustee 104 requires an account recovery code for an account holder. Once the servers 106 have received the request for account recovery codes, the servers 106 transmit the verification form to the trustee 104 in operation 604. The verification form asks the trustee to provide both the trustee's email address and the account holder's email address. A representation of such an email is illustrated in FIG. 2 discussed above.

In operation 606, the trustee's computing device 105 receives the verification form and in operation 608, the trustee 104 completes the verification form. The completed verification form is transmitted to the servers 106 in operation 610. In operation 612, one or more of the servers 106 receive the completed verification form. At this point, one or more of the servers 106 may identify the trustee in operation 614. The servers 106 compare the email addresses submitted on the completed verification form with the email addresses for both the respective trustee 104 and the account holder 102 that are contained in the database established when the account holder opened an account and configured the trustees 104. If the email addresses match the addresses stored in the servers 106, the process continues. If the email addresses do not match the addresses stored in the servers 106, the process is aborted. At this point, one or more of the servers 106 may be configured to send an email to the respective trustee 104 stating that the process is aborted and no further communication will be allowed with respect to the account recovery process or the process may allow the trustee another attempt at providing the addresses, depending on the level of security desired. The use of the trustee's email address ensures that the individual who purports to be the trustee actually is the trustee.

In operation 626, the trustee is selected. In operation 628, a transmit link and a code are transmitted to the trustee's email address 105 along with instructions on the next steps for the trustee 104 to take. As discussed above, the transmission to the trustee may only contain a code that may be sent back to the server 110 by SMS message or other similar communications. In this embodiment, a link would not be necessary.

A representative communication is shown in FIG. 3. The account recovery system creates a record to track the request and the email sent to the trustee will contain a code pointing to this record. The trustee 104 receives this link and code at the computing device 105 in operation 630. In operation 632, the trustee 104 verifies the link and code by copying the link into their browser's address bar. In operation 634, the trustee 104 transmits the link and code to the servers 106 and the servers 106 receive the link and code in operation 636. This emailed link and code are required to prove the trustee's identity and retrieve the account recovery code.

An attacker who could convince a trustee to forward the email would be able to retrieve the code. Two countermeasures against this attack are the email's subject, which may begin with, as an example only, "FOR YOU ONLY", and the message body, which begins with a conspicuous warning, as an example only, "do not forward any part of this email to anyone."

Once the servers 106 receive the verified link and code in operation 636, the servers 106 transmit a situational query to the trustee's computing device 105 in operation 638. The computing device 105 receives and the trustee 104 completes the query in operation 640. The response is then transmitted to the servers 106 in operation 642. The servers 106 receive the query response in operation 644. An illustrative example of the query is shown in FIG. 4. The query asks questions related to the relationship and method of contact with the account holder. When the trustee 104 pastes the link from the trustee-authentication email into her browser, the trustee 104 may be asked to explain why an account recovery code is being requested by choosing from a set of options, illustrated in FIG. 3.

These options may convey that the trustee has heard from the account holder personally or that the trustee is responding to a request from a third party. The options that indicate the highest risk of fraud are listed at the top in order to maximize the chance that the trustee will read them before making a choice. If the trustee 104 chooses either of the top two options, the servers will transmit a warning message to computing device 105 in operation 646. The warning message describes telltale signs of fraud and encourages the trustee 104 to contact the account holder by phone or in person. The trustee receives the message in operation 648 at computing device 105. The trustee 104 may, however, given the option to disregard these warnings and continue.

The trustee 104 may also decide not to continue with the process if she is unable to confirm with the account holder that the account holder has requested an account recovery code. The warning message may also be dynamically updated to respond to ongoing security threats.

After the servers 106 have sent the warning message, one or more of the servers 106 transmit the pledge to computing device 105 in operation 650. The computing device 105 receives the pledge in operation 652 and the trustee 104 is asked to pledge to the trustee's previous answers and to pledge her understanding of the potential consequences of giving an account recovery code to someone other than the account holder. This pledge requires the trustee 104 to type the trustee's name, as provided by the account holder, and to press a button that says "I promise the above pledge is true". For example, if a trustee reports receiving a request from the account holder via voicemail, the trustee would be asked to pledge that a code will be provided after the trustee reaches the account holder "in person."

After the trustee 104 has signed the pledge, the trustee's computing device 105 transmits the pledge to one or more of the servers 106 in operation 654 and the servers 106 receive the pledge in operation 656. After the servers 106 receive the response to the pledge, the servers 106 determine whether to transmit the account recovery code to the trustee 104 based on a probability that the trustee 104 is operating on behalf of the account holder 102 in operation 658. The probability is based on statistics from the process and known attacker criteria. If the probability is above a certain threshold determined by the level of security required, the servers 106 transmit the account recovery code to the trustee 104 in operation 660. The trustee 104 receives the account recovery code at computing device 105 in operation 662. The account recovery code can be of any format and contain both numeric and alpha characters. An account recovery code with, e.g., six alphanumeric characters has been found to provide a sufficient level of security in most cases. Once the account holder has received the required number of account recovery codes from the predetermined number of trustees, the account holder enters these codes into his account access interface and the account holder is provided access to the account.

If this is the first account recovery code requested for this account holder, the system will then email the remaining trustees to notify them of the event and encourage them to call the account holder. To further protect against attack, the account holder will be notified immediately if already online and whenever he next logs in if he is not online that an account recovery code has been sent to a trustee. If the account holder did not request an account recovery code, the account holder will know there is an attack on his account. If an attack is underway, a call from his trustees would alert the account holder to login and halt the recovery process before the attacker can complete it.

CONCLUSION

The description herein describes a backup account recovery system of last resort. The account recovery system provides a method of providing an account holder with a secure and reliable means to obtain access to his account in the event a password is lost or forgotten using social authentication. A group of trusted individuals are configured to be acceptable contacts for account recovery codes for the account holder to obtain access to an account. The trusted individuals or trustees then initiate a process with remote servers and the account recovery system to progress through a series of interchanges that provide confidence the trustee is who he says he is and that the account holder has actually requested an account recovery code.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage devices storing computer-executable instructions that, when executed, configure a computer to perform acts comprising:
    receiving, from an account holder of an account with a remote service, identification of a plurality of entities as trustees for an account recovery process for recovering access to the account with the remote service;
    subsequent to the initiation of the account recovery process, transmitting, by one or more devices associated with the remote service, a respective account recovery code to each of the plurality of entities identified as trustees for the account, the respective account recovery codes being distinct from one another;
    receiving, by the one or more devices associated with the remote service, at least a predefined number of distinct account recovery codes from the account holder over a network;
    verifying, by the one or more devices associated with the remote service, the account holder at least in part in response to the receiving of at least the predefined number of distinct account recovery codes of the account recovery codes from the account holder; and providing account recovery information to the account holder based at least in part on the verifying the account holder.

2. The one or more computer-readable storage devices of claim 1, further comprising, receiving a code to authenticate at least one of the trustees and checking the code against a database record created to track the at least one of the trustees.

3. The one or more computer-readable storage devices of claim 1, wherein each of the account recovery codes is transmitted to a pre-identified contact destination, which includes at least one of the following:
   telephone;
   e-mail; or
   text message.

4. A method, comprising:
   under control of one or more processors of one or more devices associated with a service,
   receiving, from an account holder of an account with the service, a designation of a plurality of trustees as trustees for an account recovery process;
   receiving, by the one or more devices associated with the service, a request from at least one trustee of the plurality of trustees for an account recovery code, the account recovery code for use by the account holder in conjunction with one or more other account recovery codes sent to other trustees of the plurality of trustees during the account recovery process,
   sending, to the at least one trustee, by the one or more devices associated with the service, the account recovery code.

5. The method of claim 4, wherein the account further comprises initial access information for accessing the account and the account recovery process does not recover the initial access information.

6. The method of claim 4, further comprising, prior to sending the account recovery code, transmitting a query to the at least one trustee, the query related to a manner in which the account holder requested the at least one trustee to obtain the respective account recovery code, and sending a warning message to the at least one trustee to enhance security based at least in part on an answer provided in response to the query.

7. The method of claim 4, further comprising, prior to sending the account recovery code, transmitting, to the at least one trustee, a query; and
   transmitting, to the at least one trustee, a warning message based at least in part on an answer provided in response to the query, the warning message providing the at least one trustee with information to assist at least in part in determining whether or not to proceed with the acquisition of the account recovery code.

8. The method of claim 4, further comprising receiving, from the account holder a request to abort the acquisition of the remaining account recovery codes if the account holder discovers an unauthorized attempt to obtain a first account recovery code before all of the account recovery codes have been received.

9. The method of claim 6, further comprising receiving, from the at least one trustee, an electronic signature indicating that the trustee decides to proceed with the acquisition of the account recovery code after receiving the warning message, the electronic signature providing authorization to proceed.

10. The method of claim 6, further comprising receiving, from the at least one trustee, a request to abort the acquisition of the account recovery code indicating that the at least one trustee decides not to proceed with the acquisition of the account recovery code after receiving the warning message.

11. The method of claim 6, further comprising:
   subsequent to sending the warning, determining a probability that the at least one trustee is operating on behalf of the account holder; and
   using a processor of the one or more devices associated with the service executing processor-executable instructions to determine whether to send the respective account recovery code to the trustee based at least in part on the determined probability.

12. A system, comprising:
   under control of one or more processors of one or more devices associated with a first entity configured with specific executable instructions,
   receiving, from an account holder of an account with the first entity, identification of a plurality of second entities as trustees for an account recovery process;
   receiving a request to initiate the account recovery process;
   subsequent to the initiation of the account recovery process, transmitting, by the one or more devices associated with the first entity, a respective account recovery code to at least two of the plurality of second entities identified as trustees for the account;
   receiving, from the account holder, at least a predefined number of distinct account recovery codes of the account recovery codes; and
   verifying, by the one or more devices associated with the first entity, the account holder at least in part in response to the receiving of at least the predefined number of distinct account recovery codes of the account recovery codes from the account holder.

13. The system of claim 12, wherein verifying the account holder based at least in part on receipt of at least the predefined number of the distinct account recovery codes from the account holder comprises receiving at least three of the distinct account recovery codes from the account holder, each of the at least three account recovery codes having been transmitted to a respective one of at least three separate trustees for the account.

14. The system of claim 12, wherein receiving, from the account holder of the account, identification of the plurality of second entities as trustees for the account recovery process comprises receiving identification of at least three second entities as trustees for the account recovery process.

15. The system of claim 12, further comprising transmitting a notification with the account recovery codes that the trustees are to deliver the account recovery codes to the account holder by using one or more specified communication mediums, at least one of the one or more specified communication mediums including at least a telephone call.

16. The system of claim 12, further comprising transmitting a notification with the account recovery codes that the trustees are not to deliver the account recovery codes to the account holder by using one or more specified communication mediums, the one or more specified communication mediums including at least electronic mail.

17. The system of claim 12, further comprising, during the account recovery process,
   receiving a request from each of at least two of the plurality of second entities identified as a trustee for the account for a respective account recovery code; and
   for each trustee requesting an account recovery code:
      transmitting a verification form to the trustee for authentication;

receiving the verification form from the trustee after the verification form is completed by the trustee;

identifying the trustee by comparing the verification form as completed by the trustee with information stored in a database;

transmitting a code to authenticate the trustee to a pre-identified contact destination;

receiving the code from the trustee to authenticate the trustee;

transmitting a query to the trustee;

receiving a response to the query from the trustee; and transmitting the respective account recovery code to the trustee for delivery to the account holder.

18. The system of claim 17, wherein receiving a code to authenticate the at least one of the trustees further comprises checking the code against a database record created to track the at least one of the trustees.

19. The system of claim 12, wherein the respective account recovery codes are generated by the one or more devices associated with the first entity.

20. The system of claim 12, wherein the receiving, from the account holder over the network, at least the predefined number of distinct account recovery codes of the account recovery codes comprises:

providing a user interface by which to receive at least the predefined number of distinct account recovery codes; and receiving, over the network, the distinct account recovery codes received by the user interface.

* * * * *